(12) United States Patent
Salvador et al.

(10) Patent No.: US 8,195,407 B2
(45) Date of Patent: Jun. 5, 2012

(54) ONLINE METHOD TO ESTIMATE HYDROGEN CONCENTRATION ESTIMATION IN FUEL CELL SYSTEMS AT SHUTDOWN AND STARTUP

(75) Inventors: John P. Salvador, Penfield, NY (US); Joseph Nicholas Lovria, Honeoye Falls, NY (US); Sriram Ganapathy, Rochester, NY (US); John C. Fagley, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 234 days.

(21) Appl. No.: 12/721,416

(22) Filed: Mar. 10, 2010

(65) Prior Publication Data

US 2011/0087441 A1    Apr. 14, 2011

Related U.S. Application Data

(60) Provisional application No. 61/250,429, filed on Oct. 9, 2009.

(51) Int. Cl.
   *G01N 31/00*    (2006.01)
(52) U.S. Cl. ........................................................ 702/24
(58) Field of Classification Search .................... 702/24, 702/63, 188
   See application file for complete search history.

(56) References Cited

U.S. PATENT DOCUMENTS 7,147,945 B2 * 12/2006 Balliet et al. .................. 429/429

* cited by examiner

*Primary Examiner* — Drew A Dunn
*Assistant Examiner* — Stephen Cherry
(74) *Attorney, Agent, or Firm* — John A. Miller; Miller IP Group, PLC

(57) ABSTRACT

A system and method for estimating the amount of hydrogen and/or nitrogen in a fuel cell stack and stack volumes at system start-up and shut-down. The method defines the fuel cell stack and stack volumes as discrete volumes including an anode flow-field and anode plumbing volume, a cathode flow-field volume and a cathode header and plumbing volume. The method estimates the amount of hydrogen and/or nitrogen in the anode flow-field and anode plumbing volume, the cathode flow-field volume and the cathode header and plumbing volume when the fuel cell system is shut down, during a first stage when the hydrogen partial pressure between the anode and cathode is not in equilibrium and during a second stage when the hydrogen partial pressure between the anode and cathode is in equilibrium by considering various flows into and out of the volumes.

18 Claims, 3 Drawing Sheets

ONLINE METHOD TO ESTIMATE HYDROGEN CONCENTRATION ESTIMATION IN FUEL CELL SYSTEMS AT SHUTDOWN AND STARTUP

CROSS-REFERENCE TO RELATED APPLICATIONS

This application claims the benefit of the priority date of U.S. Provisional Patent Application Ser. No. 61/250,429, titled Hydrogen Concentration Estimation in Fuel Cell Systems at Shutdown and Startup, filed Oct. 9, 2009.

BACKGROUND OF THE INVENTION

1. Field of the Invention

This invention relates generally to a system and method for estimating the concentration of hydrogen and/or nitrogen in a fuel cell system at system shut-down and start-up and, more particularly, to a system and method for estimating the concentration of hydrogen and/or nitrogen in a fuel cell system at system shut-down and start-up that includes defining the fuel cell system into an anode flow-field and plumbing volume, a cathode flow-field volume and a cathode header and plumbing volume and calculating the fluxes of hydrogen, nitrogen, oxygen and/or water into and out of the volumes.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between the two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

At system start-up, assuming enough time has gone by since the previous shut-down, most of the hydrogen remaining in the stack at the last shut-down has diffused out of the stack and both the cathode and anode flow channels are generally filled with air. When hydrogen is introduced into the anode flow channels at system start-up, the hydrogen pushes the air out of the anode flow channels creating a hydrogen/air front that travels through the anode flow channels. As described in the literature, the presence of the hydrogen/air front on the anode side combined with air on the cathode side causes a series of electrochemical reactions to occur that result in the consumption of the carbon support on the cathode side of the MEA, thereby reducing the life of the MEAs in the fuel cell stack. For example, it has been shown that without addressing the degradation effects of the hydrogen/air front at system start-up, it is possible for about 100 shut-down and start-up cycles to destroy the fuel cell stack in this manner.

One known technique for significantly reducing the air/hydrogen front at system start-up, and thus, reducing catalytic corrosion is to reduce the frequency of start-ups in which the anode and cathode are filled with air. One strategy to achieve this is to leave the anode and cathode in a nitrogen/hydrogen environment. However, the hydrogen will eventually either diffuse out of the anode, or be consumed by oxygen slowly returning to the stack. Thus, in order to extend the ability to reduce catalytic corrosion, hydrogen can be periodically injected into the stack while the system is shut-down. Because mostly nitrogen is remaining in the cathode side at system shut-down, as the result of the oxygen being consumed by the fuel cell reaction, nitrogen and hydrogen are the main elements that are equalized in the cathode and anode sides of the fuel cell stack after system shut-down. This does not allow air including oxygen to form the air/hydrogen front.

When the fuel cell system is shut down, the gas permeation continues through the membrane until the gas component partial pressures have equalized on both sides of the membrane. The diffusivity of hydrogen through the membrane from the anode to the cathode is approximately three times the rate of nitrogen from the cathode to the anode. Higher hydrogen diffusivity rates equate to a rapid equalization of hydrogen partial pressures compared to a relatively slow equalization of nitrogen partial pressure. The difference in gas diffusivities causes the anode sub-system absolute pressure to drop until the cathode hydrogen partial pressure reaches the anode hydrogen partial pressure. Typically, the anode side of the fuel cell stack is operated at a high hydrogen concentration, such as greater than 60%, and large volumes of hydrogen-rich gas exist in the anode headers and anode plumbing outside of the anode of the stack. As the anode absolute pressure drops, more hydrogen is drawn out of the anode sub-system into the anode flow field of the stack.

The net result of the hydrogen partial pressure equalization after system shut-down is an increase in the concentration of hydrogen in the cathode side of the fuel cell stack with time, at least for some period of time after shut-down. At system start-up, the compressor is started, but the concentration of hydrogen exiting the fuel cell stack from the cathode must be limited so as to not violate emission requirements. Thus, as the cathode of the fuel cell is filled with fresh air, the hydrogen rich gas leaving the cathode side of the stack must be diluted. To meet start-time and noise requirements, there is a need to optimize the fill time of the stack cathode. Because the cathode flow is limited by the power available to the compressor, the fill method must be robust to changes in total compressor flow rate.

It is desirable to predict or estimate the amount of hydrogen in the anode and cathode of a fuel cell system during system start-up to allow the start-up strategy to meet emissions requirements while maximizing reliability and minimizing start time. It is generally desirable that the hydrogen concentration estimator be robust to shut-down and off time related functions and account for membrane permeation of gases as well as air intrusion from external sources. At the same time, the estimation algorithm must be simple enough to be provided in an automotive controller with the calculation sufficiently minimal so as to be completed without delaying the start-up.

Determining the hydrogen concentration in the anode and cathode of the fuel cell stack at start-up will allow the fastest possible start time because the system control does not need to provide excess dilution air when unnecessary. Further, knowing the hydrogen concentration provides a more reliable start because the amount of hydrogen in the anode that needs to be replenished will be known. This is especially relevant for start-ups from a stand-by state, or from the middle of a shut-down, where hydrogen concentrations can be relatively high.

Further, knowing the hydrogen concentration improves durability because when there is an unknown hydrogen concentration in the stack, typical start-up strategies assume the worst case percentage of hydrogen for injection purposes and 100% hydrogen for dilution purposes. In those situations, the initial anode flush with hydrogen could be slower than if the stack is known to be filled with air. The rate of corrosion is proportional to the initial hydrogen flow rate. Therefore, without accurately knowing the hydrogen concentration, each of these events will be more damaging than necessary.

Also, knowing the hydrogen concentration provides improved efficiency because a more accurate determination of hydrogen concentration in the anode and cathode prior to start-up will lead to more effective start-up decisions and potential reduction in hydrogen uses. For example, dilution air could be lowered if it is known that the stack is starting with no hydrogen in it. Further, knowing the hydrogen concentration provides more robust start-ups. In the event of a premature shut-down or a shut-down with a failed sensor, the algorithm can use physical limits to provide an upper and lower bound on the hydrogen in the cathode and anode.

SUMMARY OF THE INVENTION

In accordance with the teachings of the present invention, a system and method are disclosed for estimating the amount of hydrogen and/or nitrogen in a fuel cell stack and stack volumes at system start-up and shut-down. The method defines the fuel cell stack and stack volumes as discrete volumes including an anode flow-field and anode plumbing volume, a cathode flow-field volume and a cathode header and plumbing volume. The method estimates the amount of hydrogen and/or nitrogen in the anode flow-field and anode plumbing volume, the cathode flow-field volume and the cathode header and plumbing volume when the fuel cell system is shut down. The method also estimates the amount of hydrogen and/or nitrogen in the anode flow-field and anode plumbing volume, the amount of hydrogen in the cathode flow-field volume and the amount of hydrogen in the cathode header and plumbing volume at system start-up. These values are based on the estimation of hydrogen and nitrogen in the anode flow-field and anode plumbing volume, the cathode flow-field volume and the cathode header and plumbing volume at system shut-down during a first stage at system start-up when the pressure between the anode flow-field and the cathode flow field are not in equilibrium. The method also estimates the amount of hydrogen in the anode flow-field and plumbing volume and the cathode flow-field volume based on the estimation of the hydrogen and nitrogen in the anode flow-field and plumbing volume, the cathode flow-field volume and the cathode header and plumbing volume in the first stage during a second stage at system start-up when the anode flow-field and the cathode flow-field volume are at pressure equilibrium. The existing description uses two cathode volumes and one anode volume. Depending on the geometric configuration of the cathode and anode, extra volumes may be required. The method can be modified for those cases if necessary.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for estimating the hydrogen and/or nitrogen concentration in a fuel cell stack and other system volumes at system start-up and system shut-down is merely exemplary in nature, and is in no way intended to limit the invention or its applications or uses.

Figure 1:
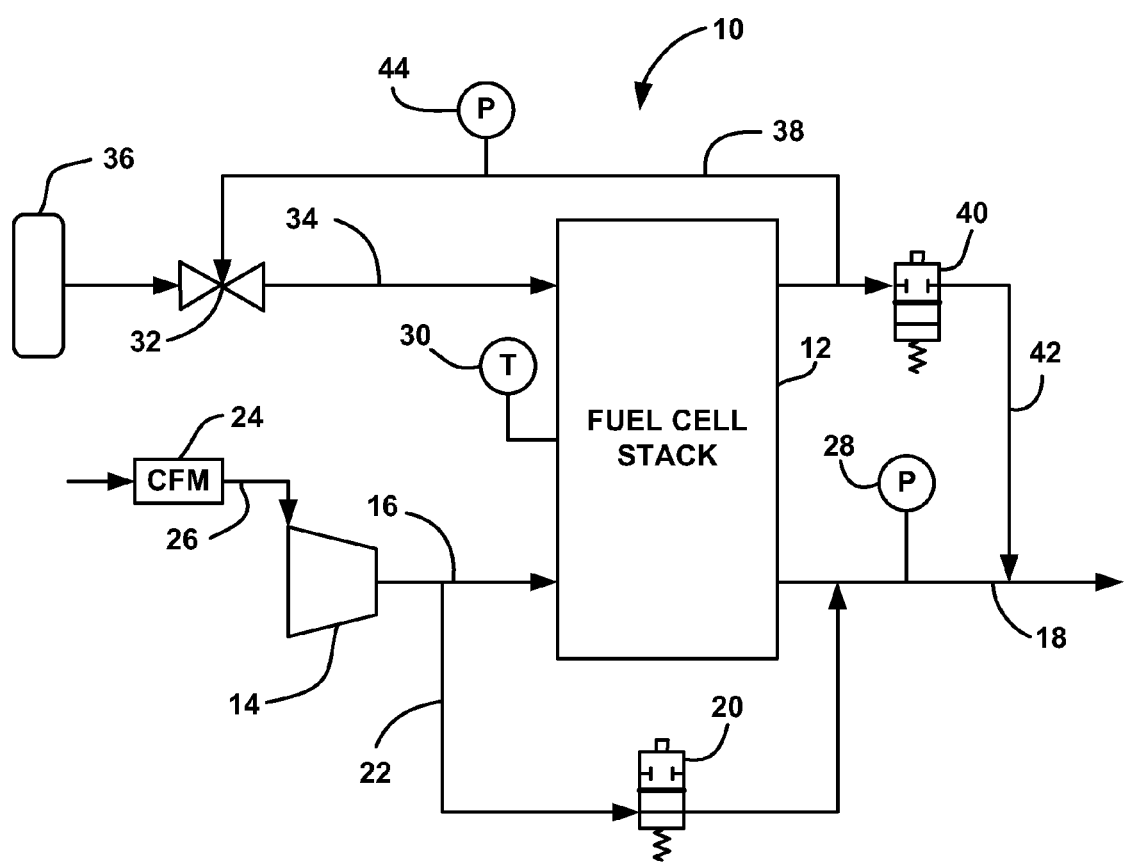
FIG. 1 is a schematic block diagram of a fuel cell system.

FIG. 1 is a schematic plan view of a fuel cell system 10 including a fuel cell stack 12. A compressor 14 provides compressed air to the cathode side of the fuel cell stack 12 on a cathode input line 16. A cathode exhaust gas is output from the fuel cell stack 12 on a cathode exhaust gas line 18. A pressure sensor 28 measures ambient pressure in the exhaust gas line 18. A by-pass valve 20 is provided in a by-pass line 22 that directly connects the cathode input line 16 to the cathode output line 18 to by-pass the stack 12. Thus, selectively controlling the by-pass valve 20 determines how much of the cathode air will flow through the stack 12 and how much of the cathode air will by-pass the stack 12. A compressor flow meter (CFM) 24 is provided in an input line 26 to the compressor 14, and measures the air flow through the compressor 14. A temperature sensor 30 is provided to measure the temperature of the stack 12.

An injector 32 injects hydrogen gas into the anode side of the fuel cell stack 12 on an anode input line 34 from a hydrogen source 36, such as a high pressure tank. The anode gas that is exhausted from the fuel cell stack 12 is recirculated back to the injector 32 on a recirculation line 38. As is well understood in the art, it is periodically necessary to bleed the anode exhaust gas to remove nitrogen from the anode side of the stack 12. A bleed valve 40 is provided in an anode exhaust line 42 for this purpose, where the bled anode exhaust gas is combined with the cathode exhaust gas on the line 18 to dilute hydrogen within the anode exhaust gas to be below combustible and/or emissions limits. A pressure sensor 44 is provided in the recirculation line 38 and provides a measurement of the pressure in the anode sub-system. Although the pressure sensor 44 is in the recirculation line 38 in this embodiment, the pressure sensor 44 can be provided at any position within the anode sub-system that is suitable to take an accurate reading of the pressure. Also, the invention as discussed herein will have application for flow-shifting systems, well known to those skilled in the art.

The cathode sub-system includes by-pass and/or exhaust valves to allow for a control of the by-pass of air around the fuel cell stack 12. Control of the various valves can be optimized to maintain the maximum desired cathode emission of hydrogen in order to fill the cathode side of the stack 12 in the minimum time possible with a specific airflow. Because the cathode sub-system is large, the concentration of hydrogen gas in the cathode sub-system is not uniform. Further, the hydrogen in the fuel cell stack 12 and various lines will continue to diminish after the last system shut-down so that not only does the concentration of hydrogen gas vary depending on location, it will continually be reduced over time.

As discussed above, a known fuel cell system shut-down procedure includes leaving a nitrogen/hydrogen mixture in both the anode and cathode flow fields of the fuel cell stack 12, where a low concentration of oxygen is typically maintained in the cathode plumbing. Hydrogen enters the cathode by permeating through the stack membranes after the cathode oxygen is substantially consumed. The present invention proposes a system and method for estimating the concentration of hydrogen and/or nitrogen in a fuel cell stack cathode and anode at system start-up and shut-down. The system and method for estimating the concentration of hydrogen and/or nitrogen in the cathode and anode is separated into a first part and a second part. The first part determines gas concentrations in the cathode and anode as the system is being shut down and the second part estimates the hydrogen concentrations within the cathode and anode through time until the next system start-up.

Figure 2:
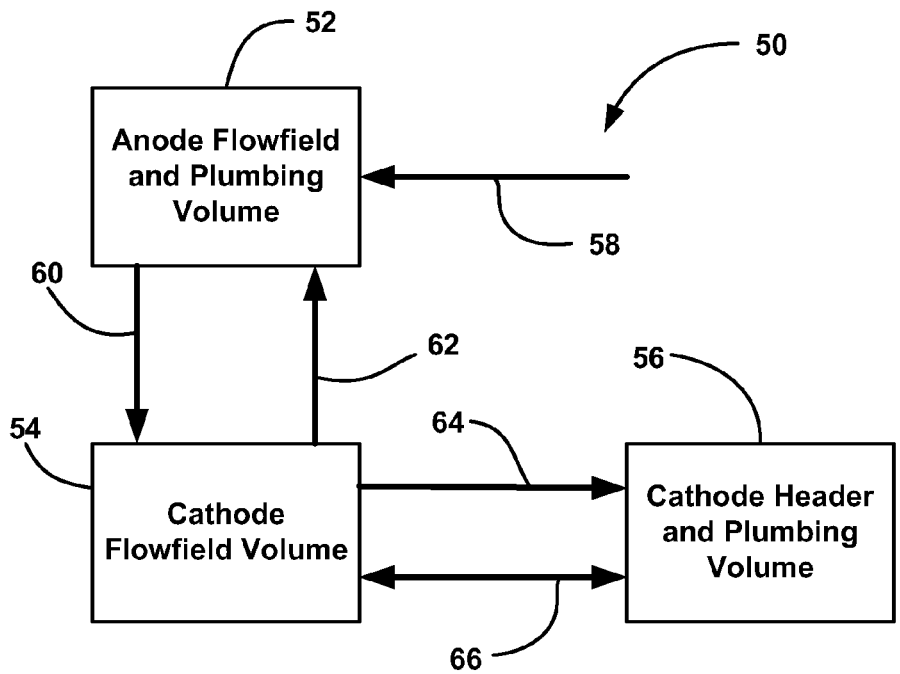
FIG. 2 is a block diagram of a system that estimates hydrogen concentration in the fuel cell stack shown in FIG. 1 for a first stage during system start-up.

For both of these parts, the system cathode and anode are separated into three defined volumes. Particularly, FIG. 2 shows a fuel cell system 50 including an anode flow-field and anode plumbing volume 52, a cathode flow-field volume 54 and a cathode header and plumbing volume 56. The relevant gas flows are shown as injected hydrogen into the anode flow-field and anode plumbing volume 52, including injector leakage on line 58, permeation of hydrogen from the anode flow-field and anode plumbing volume 52 to the cathode flow-field volume 54 on line 60, nitrogen permeation from the cathode flow-field volume 54 to the anode flow-field and anode plumbing volume 52 on line 62, the diffusion and convection of hydrogen from the cathode flow-field volume 54 to the cathode header and plumbing volume 56 on line 64 and the convection of nitrogen from the cathode header and cathode plumbing volume 56 to the cathode flow-field volume 54 on line 66. These convection terms occur due to cooling of the system over time during shut-down. The grouping of all anode volumes into one volume is a simplification based on the assumption that the stack internal volume is much greater than the plumbing volume. If this assumption is not accurate for a given system, then extra volumes could be required. Similarly, the cathode header and plumbing volume 56 could be divided into multiple volumes, given an individual system's geometric characteristics.

For the first part of the procedure, the system 10 is in the process of shutting down or entering a stand-by state. The algorithm estimates the moles of hydrogen and nitrogen in the anode flow-field and anode plumbing volume 52, the cathode flow-field volume 54 and the cathode header and plumbing volume 56 at regular time steps during the shut-down procedure. The initial values for the anode hydrogen and nitrogen are determined by a set of calibrations or a suitable run-time model. Humidity is managed by subtracting the partial pressure of water in the anode and cathode from the overall pressure. At the end of the shut-down, the estimated hydrogen and nitrogen concentration values, along with the shut-down time and critical system pressures and temperatures, are recorded in the controller's non-volatile memory so that they survive ignition key cycles. Relative humidity levels and initial oxygen concentration are also recorded.

A detailed discussion of the operation of estimating gas concentration is as follows for a particular non-limiting embodiment for the determination of nitrogen and hydrogen flows for the first part of the shut-down process. The total moles of nitrogen in the anode flow-field and anode plumbing volume 52 is provided by:

$$n_{An}^{N2}(k+1) = n_{An}^{N2}(k) - (\dot{n}^{N2}(k)*\Delta t) \quad (1)$$

Where nitrogen is permeating into the anode through the flow line 62 as:

$$\dot{n}^{N2}(k) = C_2 * (P_{An}^{N2}(k) - P_{Ca}^{N2}(k)) \quad (2)$$

Where, $n_{An}^{N2}$ is the anode nitrogen moles, $\dot{n}^{N2}(k)$ is the nitrogen molar flow rate from anode to cathode, $C_2$ is an anode to cathode nitrogen permeation coefficient and is a function of membrane characteristics and local conditions, such as temperature and relative humidity, $P_{An}^{N2}$ and $P_{Ca}^{N2}$ are partial pressures of nitrogen gas in anode and cathode, respectively, and $\Delta t$ is a time step, where postscripts k and k+1 refer to times k and k+1 and $t(k+1)-t(k)=\Delta t$.

The hydrogen permeation on the flow line 60 is provided by an equation analogous to equation (2) as:

$$\dot{n}^{H2}(k) = C_1 * (P_{An}^{H2}(k) - P_{Ca}^{H2}(k)) \quad (3)$$

Where $\dot{n}^{H2}(k)$ is the hydrogen molar flow rate from anode to cathode, $C_1$ is an anode to cathode hydrogen permeation coefficient and is a function of membrane characteristics and local conditions, and $P_{An}^{H2}(k)$ and $P^{CaH2}(k)$ are the partial pressures of hydrogen in the anode and cathode, respectively.

The ideal gas law is used to estimate the total number of moles of dry gas that the anode flow-field and anode plumbing volume 52 can hold, correcting for the humidity. Since the pressure in the anode is measured by the sensor 44, and the pressure is maintained by adding pure hydrogen to the anode through the line 58, the total moles of hydrogen in the anode volume 52 are estimated by subtracting the amount of nitrogen in the anode from the total moles in the anode.

$$n_{An}(k) = \frac{(P_{an}(k) - RH^{est}(k) * P^{sat}(k)) * V_{An}}{R * (T^{Stck}(k))} \quad (4)$$

$$n_{An}^{H2}(k+1) = n_{An}(k) - n_{An}^{N2}(k) \quad (5)$$

Where, $n_{An}^{H2}$ is the anode hydrogen moles, $n_{An}^{N2}$ is the anode nitrogen moles, $T^{Stck}(k)$ is the stack temperature, $V_{An}$ is the anode volume, $RH^{est}(k)$ is the relative humidity in the anode, $P^{sat}(k)$ is the saturation pressure at the stack temperature, $P_{an}(k)$ is the anode pressure, and $n_{An}$ is the total anode moles.

The hydrogen diffusion and convection on the flow line 64 from the cathode flow-field volume 54 to the cathode plumbing volume 56 is provided by:

$$\dot{n}_{Ca\,plumb}^{H2}(k) = (\dot{n}_{Dfsn}^{H2}(k) + \dot{n}_{Conv}^{H2}(k)) \quad (6)$$

Where $\dot{n}^{Ca\,plumbH2}$ is the cathode plumbing hydrogen moles, $\dot{n}_{Ca\,plumb}^{H2}$ is the hydrogen flow rate into the cathode plumbing on the line 64, $\dot{n}_{Dfsn}^{H2}$ is the hydrogen flow rate due to diffusion, and $\dot{n}_{Conv}^{H2}(k)$ is the rate of hydrogen convection along the line 64.

The hydrogen flow rate due to diffusion $\dot{n}_{Dfsn}^{H2}$ is provided using:

$$\dot{n}_{Dfsn}^{H2}(k) = C_3 * (y_{Ca\,ffld}^{H2}(k) - y_{Ca\,plumb}^{H2}(k)) \quad (7)$$

Where $C_3$ is an effective hydrogen diffusion coefficient, which may include effects of natural convection mixing as well as molecular diffusion, $y_{Ca\,ffld}^{H2}$ is the cathode flow-field hydrogen mode fraction, and $y_{Ca\,plumb}^{H2}$ is the cathode plumbing hydrogen mole fraction.

The hydrogen flow rate due to convection along the line 64, $\dot{n}_{Conv}^{H2}(k)$ is provided using:

$$\dot{n}_{Conv}^{H2}(k) = (\dot{n}^{H2}(k) - \dot{n}^{N2}(k) - \dot{n}_{Dfsn}^{H2}(k)) * y_{Ca\,ffld}^{H2}(k) \quad (8)$$

Where $\dot{n}^{H2}(k)$ and $\dot{n}^{N2}(k)$ are the hydrogen and nitrogen permeation from the anode, respectively, and $y_{Ca\,ffld}^{H2}(k)$ is the mole fraction of hydrogen in the cathode flow field. A material balance is used to develop equation (8). It is based on the assumption that since the cathode is not fully sealed, the cathode pressure is not changing.

The total moles of hydrogen in the cathode plumbing volume 56 is described by:

$$n_{Ca\,plumb}^{H2}(k+1) = n_{Ca\,plumb}^{H2}(k) + (\dot{n}_{Ca\,plumb}^{H2}(k) * \Delta t) \quad (9)$$

The total moles of hydrogen in the cathode flow-field volume 54 is described by:

$$n_{Ca\,ffld}^{H2}(k+1) = n_{Ca\,ffld}^{H2}(k) + (\dot{n}_{Ca\,ffld}^{H2}(k) * \Delta t) \quad (10)$$

Where the flow of hydrogen into or out of the cathode flow-field volume 54 is described by:

$$\dot{n}_{Ca\,ffld}^{H2}(k) = (\dot{n}^{H2}(k) - \dot{n}_{Dfsn}^{N2}(k) - \dot{n}_{Conv}^{N2}(k)) \quad (11)$$

Where, $\dot{n}^{H2}$ is the hydrogen permeation rate from the anode $n_{Ca\,ffld}^{H2}$ is the cathode flow-field hydrogen moles, $\dot{n}_{Ca\,ffld}^{H2}(k)$ is the cathode flow-field hydrogen flow rate and $\Delta t$ is the time step.

The moles of nitrogen in the cathode flow-field volume 54 is provided by:

$$n_{Ca\,ffld}^{N2}(k) = n_{Ca\,ffld}(k) - n_{Ca\,ffld}^{H2}(k) \quad (12)$$

Where, $n_{Ca\,ffld}^{N2}$ is the cathode flow-field nitrogen moles and $n_{Ca\,ffld}^{H2}$ is the cathode flow-field hydrogen moles and $n_{Ca\,ffld}$ is flow-field total moles, estimated using the ideal gas law, knowledge of the cathode pressure and temperature, and correcting for relative humidity. This uses the assumption that during a shut-down that leaves a H2/N2 mixture in the cathode and anode, the oxygen concentration is low enough so as to be neglected. To support this assumption, the initial time might need to be modified. The nitrogen flow rate between the cathode flow-field and the cathode header and plumbing on line 66 could be calculated from equation (12), however, it is not explicitly required in other equations.

The second part of the procedure is used when the system 10 is restarted. When the controller turns on, and ideally before any gases are flowing, a model predicts the hydrogen, nitrogen and air gas movement within the volumes that occurred while the system 10 was shut-down, including hydrogen consumption and overboard loss. The model uses pressures, temperatures, gas concentrations, shut-down time, etc. stored in the non-volatile memory from the first part as initial conditions. The model estimates the hydrogen concentration in the anode and cathode as a function of the time that the system has been turned off.

To simplify the solution, the shut-down model is divided into two stages. In a first stage, hydrogen and nitrogen quickly equilibrate across the stack membranes and hydrogen diffuses into the cathode plumbing. For some plumbing configurations, equilibrium typically occurs 15-45 minutes after shut-down It is assumed that very little hydrogen is lost in the first stage because the header oxygen is assumed to be consumed during the last shut-down and any overboard diffusion effects are negligible. In a second stage, the oxygen from the downstream cathode plumbing will slowly flow back into the stack consuming the hydrogen. Also, a very small concentration of hydrogen could leave the system through overboard leakage. If there is stored hydrogen in an intermediate upstream volume, possible leakage into the fuel cell system can be accounted for.

For the first stage calculations, the nitrogen permeation flow on the line 62 is the same as equation (2), the hydrogen permeation flow on the line 60 is the same as equation (14), the hydrogen diffusion and convection flow on the line 64 is the same as equations (7) and (8) and the nitrogen convection flow on the line 66 is implicitly described by equation (12). In this description, it is assumed that air is able to slowly leak into the system via the cathode while off, either through cathode valves, or by other means. This results in a cathode pressure that remains within a few kPa of ambient pressure. If a cathode system is completely sealed, such that the cathode pressure cannot be assumed to be constant, then the cathode would become a closed system. Pressure in the cathode flow-field would need to be calculated for each time step, and nitrogen convection into the flow field would need to be calculated explicitly, rather than inferred by equation (12).

Since the anode pressure is not known while the system is off, it needs to be estimated at each time step. The amount of hydrogen in the anode flow-field and plumbing volume 52 is calculated using:

$$n_{An}^{H2}(k+1) = n_{An}^{H2}(k) - (\dot{n}^{H2}(k) * \Delta t) \quad (13)$$

The injector leakage on the flow line 58 is provided by:

$$\Delta n_{An_{leak}}^{H2} = \frac{(P_{AnInjIn}^{Shdn} - P_{AnInjIn}^{Wakeup}) * V_{AnInjIn}}{R * (T_{AnInjIn}^{meas})} \quad (14)$$

Where, $\Delta An_{n_{leak}}^{H2}$ is the moles of hydrogen leaked from the supply line, $P_{AnInjIn}^{Shdn}$ and $P_{AnInjIn}^{Wakeup}$ are the supply line pressure at shut-down and start-up, respectively, $V_{AnInjIn}$ is the supply line volume, $T_{AnInjIn}^{meas}$ is the supply line temperature, and R is the ideal gas constant. If the time since the previous shutdown is sufficiently short that the system is started before the end of stage 1, and there is appreciable injector leakage e, $n_{An}^{H2}(k)$ can be modified by adding a fraction of the leakage $\Delta n_{An_{leak}}^{H2}$ leak at each time step. The total anode pressure is calculated using:

$$P_{an}(k) = \frac{(n_{An}^{H2}(k) + n_{An}^{N2}(k)) * R * T^{Stck}(k)}{V_{An}} \quad (15)$$

Where $V_{An}$ is the anode volume and $T^{Stck}(k)$ is the stack temperature.

Figure 3:
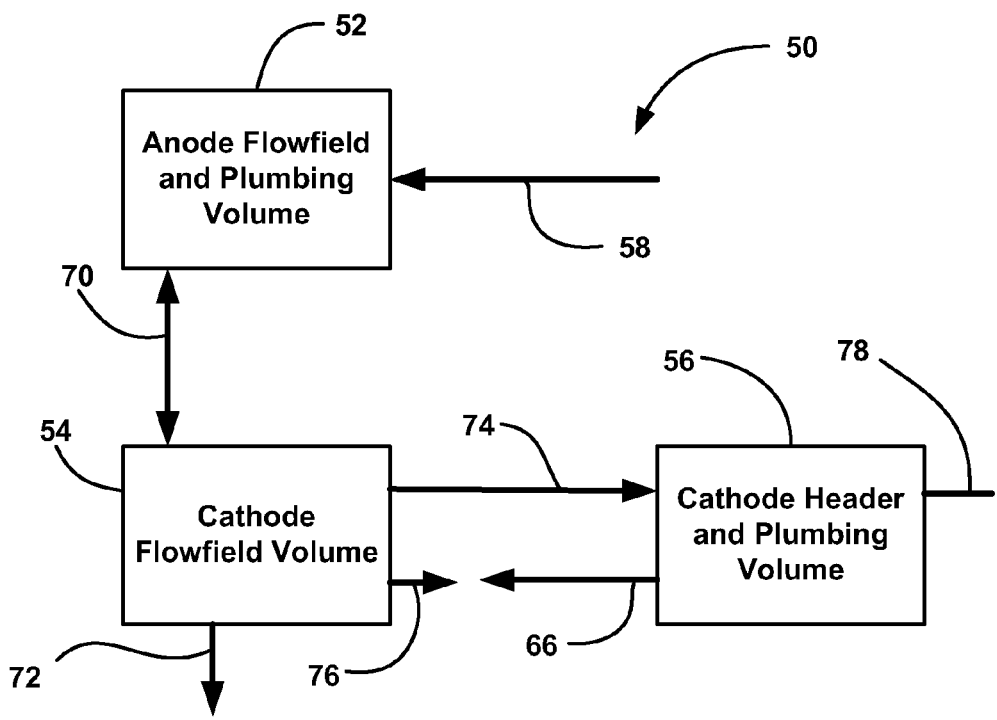
FIG. 3 is a block diagram of a system that estimates hydrogen concentration in the fuel cell stack shown in FIG. 1 for a second stage during system start-up.

In the second stage, it is assumed that the hydrogen permeation through the membranes is much faster than the amount of hydrogen that is lost overboard or consumed. FIG. 3 shows the system 50 including the anode flow-field and anode plumbing volume 52, the cathode flow-field volume 54 and the cathode header and plumbing volume 56. Once the cathode and anode have similar hydrogen and nitrogen partial pressures, the gas flows can be identified by the following; (1) injector leakage into the anode flow-field and plumbing volume on the line 58, (2) equalization of partial pressures that cause hydrogen to flow between the anode flow-field and plumbing volume 52 and the cathode flow-field volume on line 70, (3) hydrogen leakage from the cathode flow-field volume on line 72, (4) hydrogen flow from the cathode flow-field volume 54 to the cathode header and plumbing volume on line 74, (5) oxygen diffusion and convection from the cathode header and plumbing volume 56 to the cathode flow-field volume 54 on line 76, and (6) oxygen flow into the cathode header and plumbing volume 56 as a result of thermal gas contraction on line 78.

As a simplification, the moles of hydrogen in the anode flow-field and anode plumbing volume 52 is directly related to the cathode flow-field volume 54:

$$n_{An}^{H2}(k) = n_{Caffld}^{H2}(k) * \frac{V_{An}}{V_{Caffld}} \tag{16}$$

Where, $V_{An}$ and $V_{Caffld}$ are the anode and cathode flow-field volumes, respectively.

The moles of hydrogen in the cathode flow-field volume 54 is provided by:

$$n_{Caffld}^{H2}(k) = (Ae^{-C_7 t} - B(1-e^{-C_8 t})) \tag{17}$$

Where, t is fuel cell system off time as counted from the end of the first stage, $C_7$ is a tunable constant describing hydrogen leakage overboard and $C_8$ is a tunable constant describing oxygen intrusion due to thermal gas contraction. This constant can be a function of the difference between stack and ambient temperature.

The initial hydrogen in the cathode flow-field volume 54 for long off times A is provided by:

$$A = n_{Caffld}^{H2}(k) + \frac{\Delta n_{An_{leak}}^{H2}}{2} \tag{18}$$

The oxygen intrusion due to the thermal gas contraction on the flow line 78 is provided by:

$$B = n_{Ca}^{O2} \tag{19}$$

Where, $n_{Ca}^{O2}$ is a turning parameter describing moles of oxygen in the cathode plumbing at shut-down, along with extra oxygen known to diffuse back into the cathode from ambient and can be a function of the differences between stack and ambient temperatures.

The hydrogen injector leakage flow on the flow line 58 is provided by:

$$\Delta n_{An_{leak}}^{H2} = \frac{(P_{AnInjIn}^{Shdn} - P_{AnInjIn}^{Wakeup}) * V_{AnInjIn}}{R * (T_{AnInjIn}^{meas})} \tag{20}$$

In an alternative embodiment, material balances around water and oxygen content could be created and managed. However, while using a model with more content and computational complexity is appealing, it would not necessarily increase the overall algorithm's accuracy.

Figure 4:
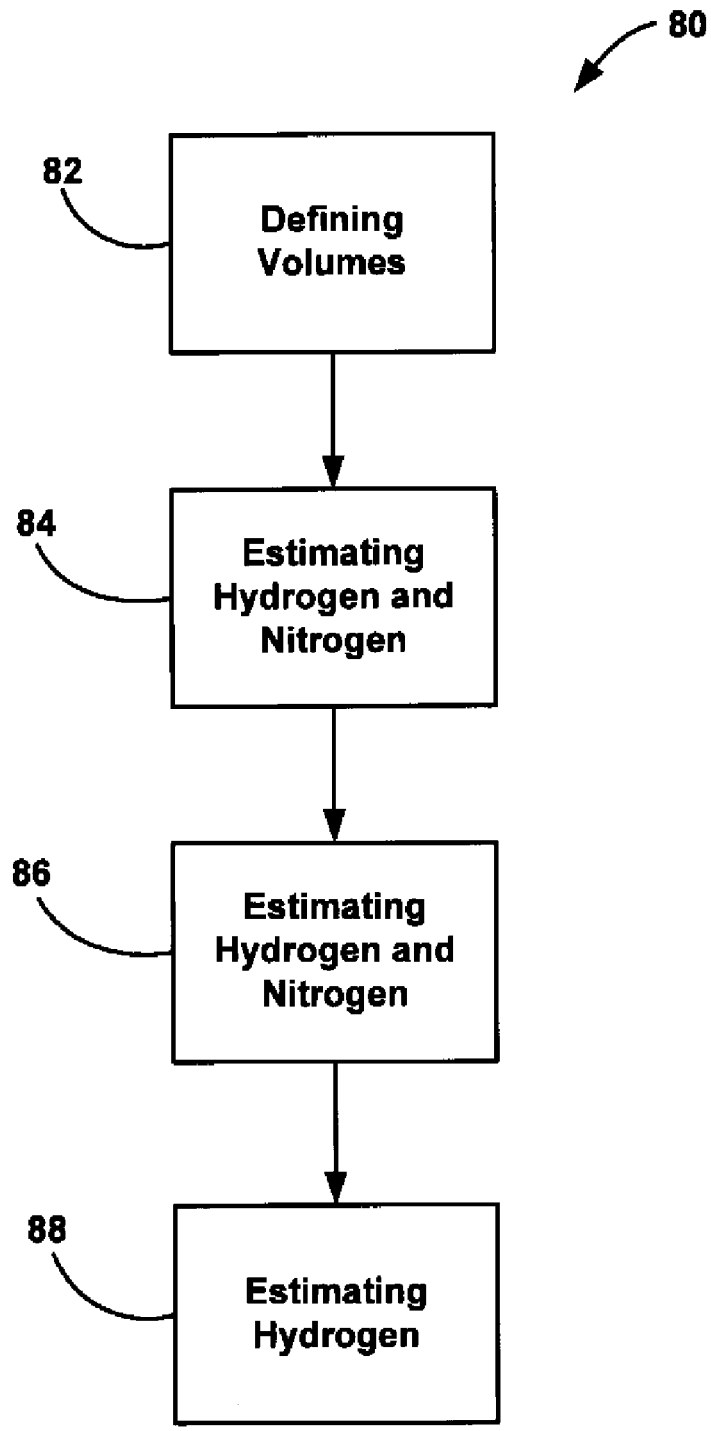
FIG. 4 is a flow chart diagram showing a method for estimating the hydrogen and/or nitrogen concentration in a fuel cell system during shut-down, start-up or any transitional state.

FIG. 4 is a flow chart diagram 80 showing a method for estimating the hydrogen and/or nitrogen concentration in the fuel cell system 10 during shut-down, start-up or any transitional state. The method can be used for scheduling hydrogen and air flows to meet emissions, durability and efficiency requirements. At box 82, the method defines the fuel cell system 10 as discrete volumes including the anode flow-field and anode plumbing volume 52, the cathode flow-field volume 54 and the cathode header and plumbing volume 56. At box 84, the method estimates the amount of hydrogen and nitrogen in the anode flow-field and anode plumbing volume 52, the cathode flow-field volume 54 and the cathode header and plumbing volume 56 when the fuel cell system 10 is shut down. At box 86, the method estimates the amount of hydrogen and nitrogen in the anode flow-field and anode plumbing volume 52, the amount of hydrogen in the cathode flow-field volume 54 and the amount of hydrogen in the cathode header and plumbing volume 56 at system start-up that is based on the estimation of hydrogen and nitrogen in the anode flow-field and anode plumbing volume 52, the cathode flow-field volume 54 and the cathode header and plumbing volume 56 at system shut-down during a first stage at system start-up when the pressure between the anode flow-field and the cathode flow-field are not in equilibrium. At box 88, the method estimates the amount of hydrogen in the anode flow-field and anode plumbing volume 52 and the cathode flow-field volume 54 based on the estimation of the hydrogen and nitrogen in the anode flow-field and plumbing volume 52, the cathode flow-field volume 54 and the cathode header and plumbing volume 56 in the first stage during a second stage at system start-up after the anode flow-field and the cathode flow-field have equilibrated partial pressures of hydrogen and nitrogen.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for estimating the hydrogen and/or nitrogen concentration in a fuel cell system during shut-down, start-up, or any transitional state, which can be used for scheduling hydrogen and air flows to meet emissions, durability and efficiency requirements, said fuel cell system including a fuel cell stack, anode plumbing, cathode plumbing and cathode stack headers, said fuel cell stack including an anode flow-field and a cathode flow-field, said method comprising:

defining the fuel cell system as discrete volumes including an anode flow-field and anode plumbing volume, a cathode flow-field volume and a cathode header and plumbing volume;

estimating, in a controller, the amount of hydrogen and nitrogen in the anode flow-field and anode plumbing volume, the cathode flow-field volume and the cathode header and plumbing volume when the fuel cell system is shut down;

estimating the amount of hydrogen and nitrogen in the anode flow-field and anode plumbing volume, the amount of hydrogen in the cathode flow-field volume and the amount of hydrogen in the cathode header and plumbing volume at system start-up that is based on the estimation of hydrogen and nitrogen in the anode flow-field and anode plumbing volume, the cathode flow-field volume and the cathode header and plumbing volume at system shut-down during a first stage at system start-up when the pressure between the anode flow-field and the cathode flow-field are not in equilibrium; and estimating the amount of hydrogen in the anode flow-field and plumbing volume and the cathode flow-field volume based on the estimation of the hydrogen and nitrogen in the anode flow-field and plumbing volume, the cathode flow-field volume and the cathode header and plumbing volume in the first stage during a second stage at system start-up after the anode flow-field and the cathode flow-field have equilibrated partial pressures of hydrogen and nitrogen.

2. The method according to claim 1 wherein estimating the amount of hydrogen and nitrogen in the anode flow-field and anode plumbing volume, the cathode flow-field volume and the cathode header and plumbing volume when the fuel cell system is being shut down considers nitrogen permeation flow from the cathode flow-field volume to the anode flow-field and anode plumbing volume, hydrogen permeation from the anode flow-field and anode plumbing volume to the cathode flow field volume, hydrogen diffusion and convection from the cathode flow-field volume to the cathode header and plumbing volume, and nitrogen convection between the cathode flow-field volume and the cathode header and plumbing volume.

3. The method according to claim 2 wherein the anode nitrogen moles are defined by the equation:

$$n_{An}^{N2}(k+1) = n_{An}^{N2}(k) - (\dot{n}^{N2}(k) * \Delta t)$$

where, $n_{An}^{N2}$ is anode nitrogen moles, $\dot{n}^{N2}(k)$ is nitrogen molar flow rate at time $t(k)$ and $\Delta t$ is time step; the hydrogen permeation flow is defined by the equation:

$$\dot{n}^{H2}(k) = C_1 * (P_{An}^{H2}(k) - P_{Ca}^{H2}(k))$$

where, $\dot{n}^{H2}$ is the total hydrogen flow rate, $P_{An}^{H2}$ and $P_{Ca}^{H2}$ are partial pressures of hydrogen gas in the anode and cathode, respectively, and $C_1$ is an anode to cathode hydrogen permeation coefficient; the nitrogen permeation flow is defined by the equation:

$$\dot{n}^{N2}(k) = C_2 * (P_{An}^{N2}(k) - P_{Ca}^{N2}(k))$$

where $\dot{n}^{N2}(k)$ is the hydrogen molar flow rate from anode to cathode, $C_2$ is an anode to cathode hydrogen permeation coefficient and is a function of membrane characteristics and local conditions, and $P_{An}^{N2}$ and $P_{Ca}^{N2}$ are the partial pressures of hydrogen in the anode and cathode, respectively; the hydrogen flow rate due to diffusion $\dot{n}_{Dfsn}^{H2}$ is defined by the equation:

$$\dot{n}_{Dfsn}^{H2}(k) = C_3 * (y_{Ca\,ffld}^{H2}(k) - y_{Ca\,plumb}^{H2}(k))$$

where $C_3$ is an effective hydrogen diffusion coefficient, which may include effects of natural convection mixing as well as molecular diffusion, $y_{Ca\,ffld}^{H2}$ is the cathode flow-field hydrogen mole fraction, and $y_{Ca\,plumb}^{H2}$ is the cathode plumbing hydrogen mole fraction in the cathode flow-field volume and the cathode plumbing volume; the hydrogen flow rate from the cathode flow-field to the cathode plumbing due to convection is defined by the equation:

$$\dot{n}_{Conv}^{H2}(k) = (n\dot{n}^{H2}(k) - \dot{n}^{N2} - \dot{n}_{Dfsn}^{H2}(k)) * y_{Ca\,ffld}^{H2}(k)$$

where $\dot{n}^{H2}(k)$ and $\dot{n}^{N2}(k)$ are the hydrogen and nitrogen permeation from the anode, respectively; and the convection of nitrogen between the cathode plumbing and the cathode flow-field is derived implicitly from:

$$n_{Ca\,ffld}^{N2}(k) = n_{Ca\,ffld}(k) - n_{Ca\,ffld}^{H2}(k)$$

where, $n_{Ca\,ffld}^{N2}$ is the cathode flow-field nitrogen moles and $n_{Ca\,ffld}^{H2}$ is the cathode flow-field hydrogen moles and $n_{Ca\,ffld}$ is flow-field total moles that is estimated using the ideal gas law, assuming that humidification is constant and the partial pressure of water can be subtracted from the total pressure, which is measured in both the anode and the cathode, wherein the equations provide material balances around each volume, and wherein at the end of each time step, mole fractions are calculated from moles of individual species and total moles.

4. The method according to claim 1 wherein estimating the amount of hydrogen and nitrogen in the anode flow-field and plumbing volume, the cathode flow-field volume and the cathode header and plumbing volume during the first stage considers an injector leakage flow into the anode flow-field and anode plumbing volume, a hydrogen permeation flow from the anode flow-field and plumbing volume to the cathode flow-field volume, a nitrogen permeation flow from the cathode flow-field volume to the anode flow-field and plumbing volume, a hydrogen diffusion and convection flow from the cathode flow-field volume to the cathode header and plumbing volume and nitrogen convection flow between the cathode flow-field volume and the cathode header and plumbing volume, and accounting for a changing anode pressure with time.

5. The method according to claim 4 wherein the nitrogen permeation flow is defined by the equation:

$$\dot{n}^{N2}(k) = C_2 * (P_{An}^{N2}(k) - P_{Ca}^{N2}(k))$$

where, $\dot{n}^{N2}(k)$ is the nitrogen molar flow rate from anode to cathode, $C_2$ is an anode to cathode nitrogen permeation coefficient, $P_{An}^{N2}$ and $P_{Ca}^{N2}$ are partial pressures of nitrogen gas in anode and cathode, respectively; the hydrogen permeation flow is defined by the equation:

$$\dot{n}_{Dfsn}^{H2}(k) = C_3 * (y_{Ca\,ffld}^{H2}(k) - y_{Ca\,plumb}^{H2}(k))$$

where $C_3$ is an effective hydrogen diffusion coefficient, which may include effects of natural convection mixing as well as molecular diffusion, $y_{Ca\,ffld}^{H2}$ is the cathode flow-field hydrogen mode fraction, and $y_{Ca\,plumb}^{H2}$ is the cathode plumbing hydrogen mole fraction in the cathode flow-field volume and cathode plumbing volume; the hydrogen flow rate due to convection is defined by the equation:

$$\dot{n}_{Conv}^{H2}(k) = (\dot{n}^{H2}(k) - \dot{n}^{N2}(k) - \dot{n}_{Dfsn}^{H2}(k)) * y_{Ca\,ffld}^{H2}(k)$$

where $\dot{n}^{H2}(k)$ and $\dot{n}^{N2}(k)$ are the hydrogen and nitrogen permeation from the anode, respectively; the convection of nitrogen between the cathode plumbing volume and the cathode flow-field volume is derived implicitly from the equation:

$$n_{Ca\,ffld}^{N2}(k) = n_{Ca\,ffld}(k) - n_{Ca\,ffld}^{H2}(k)$$

where, $n_{Ca\,ffld}^{N2}$ is the cathode flow-field nitrogen moles and $n_{Ca\,ffld}^{H2}$ is the cathode flow-field hydrogen moles and $n_{Ca\,ffld}$ is flow-field total moles, estimated using the ideal gas law; the anode pressure, not including the partial pressure of water, is defined by the equation:

$$P_{an}(k) = \frac{(n_{An}^{H2}(k) + n_{An}^{N2}(k)) * R * T^{Stck}(k)}{V_{An}}$$

where $V_{An}$ is the anode volume, R is the ideal gas constant and $T^{Stck}(k)$ is the stack temperature; and the injector leakage flow is defined by the equation:

$$\Delta n_{An_{leak}}^{H2} = \frac{\left(P_{AnInjIn}^{Shdn} - P_{AnInjIn}^{Wakeup}\right) * V_{AnInjIn}}{R * (T_{AnInjIn}^{meas})}$$

where, $\Delta n_{An_{leak}}^{H2}$ is the moles of hydrogen leaked from a supply line, $P_{AnInjIn}^{Shdn}$ and $P_{AnInjIn}^{Wakeup}$ are supply line pressures at shut-down and start-up, respectively, $V_{AnInjIn}$ is a supply line volume, $T_{AnInjIn}^{meas}$ is a supply line temperature in degrees centigrade, and R is the ideal gas constant, wherein if the time since the previous shutdown is sufficiently short and there is appreciable injector leakage, $n_{An}^{H2}(k)$ can be modified by adding a fraction of the leakage $\Delta n_{An_{leak}}^{H2}$.

6. The method according to claim 1 wherein estimating the hydrogen concentration in the anode flow-field and plumbing volume and the cathode flow-field volume during the second stage includes considering a hydrogen injector leakage flow into the anode flow-field and plumbing volume, a hydrogen flow between the anode flow-field and plumbing volume and the cathode flow-field volume, a hydrogen leakage flow from the cathode flow-field volume, hydrogen diffused from the cathode flow-field volume to the cathode header and plumbing volume, an oxygen diffusion and convection flow from the cathode header and plumbing volume to the cathode flow-field volume and oxygen flow into the cathode header and plumbing volume as a result of thermal gas contraction.

7. The method according to claim 6 wherein hydrogen remaining in the cathode flow-field volume is defined by the equation:

$$n_{Ca\,ffld}^{H2}(k) = (Ae^{-C_7 t} - B(1 - e^{-C_8 t}))$$

where, t is FCS off time as counted from the end of the first stage, $C_7$ is a tunable constant describing hydrogen leakage overboard and $C_8$ is a tunable constant describing oxygen intrusion into the cathode flow-field volume from the cathode plumbing volume due to convective and diffusive forces; the initial amount of hydrogen in the cathode flow-field volume is defined by the equation:

$$A = n_{Ca\,ffld}^{H2}(k) + \frac{\Delta n_{An_{leak}}^{H2}}{2}$$

where $n_{Ca\,ffld}^{H2}(k)$ is the amount of hydrogen in the cathode flow-field volume at the end of stage one; the hydrogen injector leakage flow is defined by the equation:

$$\Delta n_{An_{leak}}^{H2} = \frac{(P_{AnInjIn}^{Shdn} - P_{AnInjIn}^{Wakeup}) * V_{AnInjIn}}{R * (T_{AnInjIn}^{meas})}$$

where $V_{AnInjIn}$ is the volume of the anode line upstream of an injector, $P_{AnInjIn}^{Shdn}$ is the pressure of a line upstream of the injector at shut-down, $P_{AnInjIn}^{Wakeup}$ is the pressure of the line upstream of the injector at start-up, R is the ideal gas constant and $T_{AnInjIn}^{meas}$ is the temperature of a line upstream of the injector at startup; the oxygen intrusion due to thermal gas contraction flow is defined by the equation:

$$B = n_{Ca}^{O2}$$

where, $n_{Ca}^{O2}$ is a turning parameter describing moles of oxygen available to consume all hydrogen in the system, assumed to be intruding into the cathode flow-field volume from the cathode plumbing volume over time; and the remaining moles of hydrogen in the anode are assumed related to the moles of hydrogen in the cathode flow-field, volume is defined by the equation:

$$n_{An}^{H2}(k) = n_{Ca\,ffld}^{H2}(k) * \frac{V_{An}}{V_{Ca\,ffld}}$$

where, $V_{An}$ and $V_{Ca\,ffld}$ are the anode and cathode flow-field volumes, respectively, using the assumption that the rate of hydrogen and nitrogen permeation through a membrane will be much faster than the rates of hydrogen leakage and oxygen intrusion.

8. The method according to claim 1 wherein estimating the amount of hydrogen and nitrogen in the anode flow-field and anode plumbing volume, the cathode flow-field volume and the cathode header and plumbing volume during the first stage considers intentionally injecting hydrogen into the anode flow-field.

9. A method for estimating the hydrogen and/or nitrogen concentration in a fuel cell during shut-down, start-up, or any transitional state, which can be used for scheduling hydrogen and air flows to meet emissions, durability and efficiency requirements, said fuel cell system including a fuel cell stack, anode plumbing, cathode plumbing and cathode stack headers, said fuel cell stack including an anode flow-field and a cathode flow-field, said method comprising:

defining the fuel cell system as discrete volumes including an anode flow-field and anode plumbing volume, a cathode flow-field volume and a cathode header and plumbing volume;

estimating, in a controller, the amount of hydrogen and nitrogen in the anode flow-field and anode plumbing volume, the cathode flow-field volume and the cathode header and plumbing volume when the fuel cell system is shut down, wherein estimating the amount of hydrogen and nitrogen in the anode flow-field and anode plumbing volume, the cathode flow-field volume and the cathode header and plumbing volume when the fuel cell system is shut down considers nitrogen permeation flow from the cathode flow-field volume to the anode flow-field and anode plumbing volume, hydrogen permeation from the anode flow-field and anode plumbing volume to the cathode flow-field volume, hydrogen diffusion and convection from the cathode flow-field volume to the cathode header and plumbing volume, and nitrogen convection between the cathode flow-field volume and the cathode header and plumbing volume;

estimating the amount of hydrogen and nitrogen in the anode flow-field and anode plumbing volume, the amount of hydrogen in the cathode flow-field volume and the amount of hydrogen in the cathode header and plumbing volume at system start-up that is based on the estimation of hydrogen and nitrogen in the anode flow-field and anode plumbing volume, the cathode flow-field volume and the cathode header and plumbing volume at system shut-down during a first stage at system start-up when hydrogen and nitrogen partial pressures in the anode flow-field volume and the cathode flow-field volume are not in equilibrium, wherein estimating the amount of hydrogen and nitrogen in the anode flow-field and plumbing volume, the cathode flow-field volume and the cathode header and plumbing volume during the first stage considers an injector leakage flow into the anode flow-field and anode plumbing volume, a hydrogen permeation flow from the anode flow-field and plumbing volume to the cathode flow-field volume, a nitrogen permeation flow from the cathode flow-field volume to the anode flow-field and plumbing volume, a hydrogen diffusion and convection flow from the cathode flow-field volume to the cathode header and plumbing volume and nitrogen convection flow between the cathode flow-field volume and the cathode header and plumbing volume; and estimating the amount of hydrogen in the anode flow-field and plumbing volume and the cathode flow-field volume based on the estimation of the hydrogen and nitrogen in the anode flow-field and plumbing volume, the cathode flow-field volume and the cathode header and plumbing volume in the first stage during a second stage at system start-up when the anode flow-field and plumbing volume and the cathode flow-field volume have equivalent partial pressures of hydrogen and nitrogen, wherein estimating the hydrogen concentration in the anode flow-field and plumbing volume and the cathode flow-field volume during the second stage includes considering a hydrogen injector leakage flow into the anode flow-field and plumbing volume, a hydrogen flow between the anode flow-field and plumbing volume and the cathode flow-field volume, a hydrogen leakage flow from the cathode flow-field volume, hydrogen diffused from the cathode flow-field volume to the cathode header and plumbing volume, an oxygen diffusion and convection flow from the cathode header and plumbing volume to the cathode flow-field volume and oxygen flow into the cathode header and plumbing volume as a result of thermal gas contraction.

10. The method according to claim 9 wherein estimating the amount of hydrogen and nitrogen in the anode flow-field and anode plumbing volume, the cathode flow-field volume and the cathode header and plumbing volume considers intentionally injecting hydrogen into the anode flow-field.

11. A system for estimating the hydrogen and/or nitrogen concentration in a fuel cell system during shut-down, start-up, or any transitional state, which can be used for scheduling hydrogen and air flows to meet emissions, durability and efficiency requirements, said fuel cell system including a fuel cell stack, anode plumbing, cathode plumbing and cathode stack headers, said fuel cell stack including an anode flow-field and a cathode flow-field, said system comprising:

means for defining the fuel cell system as three volumes including an anode flow-field and anode plumbing volume, a cathode flow-field volume and a cathode header and plumbing volume;

means for estimating the amount of hydrogen and nitrogen in the anode flow-field and anode plumbing volume, the cathode flow-field volume and the cathode header and plumbing volume when the fuel cell system is shut down;

means for estimating the amount of hydrogen and nitrogen in the anode flow-field and anode plumbing volume, the amount of hydrogen in the cathode flow-field volume and the amount of hydrogen in the cathode header and plumbing volume at system start-up that is based on the estimation of hydrogen and nitrogen in the anode flow-field and anode plumbing volume, the cathode flow-field volume and the cathode header and plumbing volume at system shut-down during a first stage at system start-up when the partial pressure of hydrogen and nitrogen in the anode flow-field volume and the cathode flow-field are about the same; and means for estimating the amount of hydrogen in the anode flow-field and plumbing volume and the cathode flow-field volume based on the estimation of the hydrogen and nitrogen in the anode flow-field and plumbing volume, the cathode flow-field volume and the cathode header and plumbing volume in the first stage during a second stage at system start-up when the anode flow-field and the cathode flow-field volume are at pressure equilibrium.

12. The system according to claim 11 wherein the means for estimating the amount of hydrogen and nitrogen in the anode flow-field and anode plumbing volume, the cathode flow-field volume and the cathode header and plumbing volume when the fuel cell system is shut-down considers nitrogen permeation flow from the cathode flow-field volume to the anode flow-field and anode plumbing volume, hydrogen permeation from the anode flow-field and anode plumbing volume to the cathode flow-field volume, hydrogen diffusion and convection from the cathode flow-field volume to the cathode header and plumbing volume, and a nitrogen convention between the cathode flow-field volume and the cathode header and plumbing volume.

13. The system according to claim 12 wherein the hydrogen permeation flow is defined by the equation:

$$\dot{n}^{H2}(k) = C_1 * (P_{An}^{H2}(k) - P_{Ca}^{H2}(k))$$

where, $\dot{n}^{H2}$ is the total hydrogen flow rate, $P_{An}^{H2}$ and $P_{Ca}^{H2}$ are partial pressures of hydrogen gas in the anode and cathode, respectively, and $C_1$ is an anode to cathode hydrogen permeation coefficient; the nitrogen permeation flow is defined by the equation:

$$\dot{n}^{H2}(k) = C_2 * (P_{An}^{N2}(k) - P_{Ca}^{N2}(k))$$

where $\dot{n}^{N2}(k)$ is the hydrogen molar flow rate from anode to cathode, $C_2$ is an anode to cathode hydrogen permeation coefficient and is a function of membrane characteristics and local conditions, and $P_{An}^{N2}$ and $P_{Ca}^{N2}$ are the partial pressures of hydrogen in the anode and cathode, respectively; the hydrogen flow rate due to diffusion $\dot{n}_{Dfsn}^{H2}$ is defined by the equation:

$$\dot{n}_{Dfsn}^{H2}(k) = C_3 * (y_{Ca\,ffld}^{H2}(k) - y_{Ca\,plumb}^{H2}(k))$$

where $C_3$ is an effective hydrogen diffusion coefficient, which may include effects of natural convection mixing as well as molecular diffusion, $y_{Ca\,ffld}^{H2}$ is the cathode flow-field hydrogen mode fraction, and $y_{Ca\,plumb}^{H2}$ is the cathode plumbing hydrogen mole fraction in the cathode flow-field volume and the cathode plumbing volume; the hydrogen flow rate due to convection is defined by the equation:

$$\dot{n}_{Conv}^{H2}(k) = (\dot{n}^{H2}(k) - \dot{n}^{N2}(k) - \dot{n}_{Dfsn}^{H2}(k)) * y_{Ca\,ffld}^{H2}(k)$$

where $\dot{n}^{H2}(k)$ and $\dot{n}^{N2}(k)$ are the hydrogen and nitrogen permeation from the anode, respectively; and the convection of nitrogen between the cathode plumbing and the cathode flowed is derived implicitly from:

$$n_{Ca\,ffld}^{N2}(k) = n_{Ca\,ffld}(k) - n_{Ca\,ffld}^{H2}(k)$$

where, $n_{Ca\,ffld}^{N2}$ is the cathode flow-field nitrogen moles and $n_{Ca\,ffld}^{H2}$ is the cathode flow-field hydrogen moles and $n_{Ca\,ffld}$ is flow-field total moles, estimated using the ideal gas law.

14. The system according to claim 11 wherein the means for estimating the amount of hydrogen and nitrogen in the anode flow-field and plumbing volume, the cathode flow-field volume and the cathode header and plumbing volume during the first stage considers an injector leakage flow into the anode flow-field and anode plumbing volume, a hydrogen permeation flow from the anode flow-field and plumbing volume to the cathode flow-field volume, a nitrogen permeation flow from the cathode flow-field volume to the anode flow-field and plumbing volume, a hydrogen diffusion and convection flow from the cathode flow-field volume to the cathode header and plumbing volume and nitrogen convection flow between the cathode flow-field volume and the cathode header and plumbing volume.

15. The system according to claim 14 wherein the nitrogen permeation flow is defined by the equation:

$$\dot{n}^{N2}(k) = C_2 * (P_{An}^{N2}(k) - P_{Ca}^{N2}(k))$$

where, $\dot{n}^{N2}(k)$ is the nitrogen molar flow rate from anode to cathode, $C_2$ is an anode to cathode nitrogen permeation coefficient, $P_{An}^{N2}$ and $P_{Ca}^{N2}$ are partial pressures of nitrogen gas in anode and cathode, respectively; the hydrogen permeation flow is defined by the equation:

$$\dot{n}_{Dfsn}^{H2}(k) = C_3 * (y_{Ca\,ffld}^{H2}(k) - y_{Ca\,plumb}^{H2}(k))$$

where $C_3$ is an effective hydrogen diffusion coefficient, which may include effects of natural convection mixing as well as molecular diffusion, $y_{Ca\,ffld}^{H2}$ is the cathode flow-field hydrogen mode fraction, and $y_{Ca\,plumb}^{H2}$ is the cathode plumbing hydrogen mole fraction in the cathode flow-field volume and cathode plumbing volume; the hydrogen flow rate due to convection is defined by the equation:

$$\dot{n}_{Conv}^{H}(k) = (\dot{n}^{H2}(k) - \dot{n}_{Dfsn}^{N2}(k)) * y_{Ca\,ffld}^{H2}(k)$$

where $\dot{n}^{H2}(k)$ and $\dot{n}^{N2}(k)$ are the hydrogen and nitrogen permeation from the anode, respectively; the convection of nitrogen between the cathode plumbing volume and the cathode flow-field volume is derived implicitly from the equation:

$$n_{Ca\,ffld}^{N2}(k) = n_{Ca\,ffld}(k) - n_{Ca\,ffld}^{H2}(k)$$

where, $n_{Ca\,ffld}^{N2}$ is the cathode flow-field nitrogen moles and $n_{Ca\,ffld}^{H2}$ is the cathode flow-field hydrogen moles and $n_{Ca\,ffld}$ is flow-field total moles, estimated using the ideal gas law; the anode pressure, not including the partial pressure of water, is defined by the equation:

$$P_{an}(k) = \frac{(n_{An}^{H2}(k) + n_{An}^{N2}(k)) * R * T^{Stck}(k)}{V_{An}}$$

where $V_{An}$ is the anode volume, R is the ideal gas constant and $T^{Stck}(k)$ is the stack temperature; and the injector leakage flow is defined by the equation:

$$\Delta n_{An_{leak}}^{H2} = \frac{(P_{AnInjIn}^{Shdn} - P_{AnInjIn}^{Wakeup}) * V_{AnInjIn}}{R * (T_{AnInjIn}^{meas})}$$

where, $\Delta n_{An_{leak}}^{H2}$ is the moles of hydrogen leaked from a supply line, $P_{AnInjIn}^{Shdn}$ and $P_{AnInjIn}^{Wakeup}$ are supply line pressures at shut-down and start-up, respectively, $V_{AnInjIn}$ is a supply line volume, $T_{AnInjIn}^{meas}$ is a supply line temperature in degrees centigrade, and R is the ideal gas constant.

16. The system according to claim 11 wherein the means for estimating the hydrogen concentration in the anode flow-field and plumbing volume and the cathode flow-field volume during the second stage considers a hydrogen injector leakage flow into the anode flow-field and plumbing volume, a hydrogen flow between the anode flow-field and plumbing volume and the cathode flow-field volume, a hydrogen leakage flow from the cathode flow-field volume, hydrogen diffused from the cathode flow-field volume to the cathode header and plumbing volume, an oxygen diffusion and convection flow from the cathode header and plumbing volume to the cathode flow-field volume and oxygen flow into the cathode header and plumbing volume as a result of thermal gas contraction.

17. The system according to claim 16 wherein hydrogen remaining in the cathode flow-field volume is defined by the equation:

$$n_{Ca\,ffld}^{H2}(k) = (Ae^{-C_7 t} - B(1 - e^{-C_8 t}))$$

where, t is FCS off time as counted from the end of the first stage, $C_7$ is a tunable constant describing hydrogen leakage overboard and $C_8$ is a tunable constant describing oxygen intrusion into the cathode flow-field volume from the cathode plumbing volume due to convective and diffusive forces; the initial amount of hydrogen in the cathode flow-field volume is defined by the equation:

$$A = n_{Caffld}^{H2}(k) + \frac{\Delta n_{An_{leak}}^{H2}}{2}$$

where $n_{Ca\,ffld}^{H2}(k)$ is the amount of hydrogen in the cathode flow-field volume at the end of stage one; the hydrogen injector leakage flow is defined by the equation:

$$\Delta n_{An_{leak}}^{H2} = \frac{(P_{AnInjIn}^{Shdn} - P_{AnInjIn}^{Wakeup}) * V_{AnInjIn}}{R * (T_{AnInjIn}^{meas})}$$

where $V_{AnInjIn}$ is the volume of the anode line upstream of an injector, $P_{AnInjIn}^{Shdn}$ is the pressure of a line upstream of the injector at shut-down, $P_{AnInjIn}^{Wakeup}$ is the pressure of the line upstream of the injector at start-up, R is the ideal gas constant and $T_{AnInjIn}^{meas}$ is the temperature of a line upstream of the injector at startup; the oxygen intrusion due to thermal gas contraction flow is defined by the equation:

$$B = n_{Ca}^{O2}$$

where, $n_{Ca}^{O2}$ is a turning parameter describing moles of oxygen available to consume all hydrogen in the system, assumed to be intruding into the cathode flow-field volume from the cathode plumbing volume over time; and the remaining moles of hydrogen in the anode are assumed related to the moles of hydrogen in the cathode flow-field, volume is defined by the equation:

$$n_{An}^{H2}(k) = n_{Caffld}^{H2}(k) * \frac{V_{An}}{V_{Caffld}}$$

where, $V_{An}$ and $V_{Ca\,ffld}$ are the anode and cathode flow-field volumes, respectively, using the assumption that the rate of hydrogen and nitrogen permeation through a membrane will be much faster than the rates of hydrogen leakage and oxygen intrusion.

18. The system according to claim 11 wherein the means for estimating the amount of hydrogen and nitrogen in the anode flow-field and anode plumbing volume, the cathode flow-field volume and the cathode header and plumbing volume during the first stage considers intentionally injecting hydrogen into the anode flow-field.

\* \* \* \* \*